June 24, 1941.  E. H. SMITH  2,247,037
PRESSURE REGULATOR
Filed Aug. 29, 1938  2 Sheets-Sheet 1

INVENTOR
ELMER H. SMITH
BY Paul, Paul, Moore & Giese
ATTORNEYS

June 24, 1941.　　　E. H. SMITH　　　2,247,037
PRESSURE REGULATOR
Filed Aug. 29, 1938　　　2 Sheets-Sheet 2

INVENTOR
ELMER H. SMITH
BY Paul, Paul, Moore & Greer
ATTORNEYS

Patented June 24, 1941

2,247,037

UNITED STATES PATENT OFFICE 2,247,037

PRESSURE REGULATOR

Elmer H. Smith, Minneapolis, Minn., assignor, by mesne assignments, to Smith Welding Equipment Corporation, Minneapolis, Minn., a corporation of Minnesota Application August 29, 1938, Serial No. 227,381

5 Claims. (Cl. 48—192)

This invention relates to new and useful improvements in pressure regulators and more particularly to such apparatus adapted for use in connection with acetylene gas generators.

In the operation of acetylene generators, difficulty is sometimes experienced in maintaining the desired flow of gas to the torch tip because of foreign matter such as lime and dust accumulating on the pressure regulating valve of the apparatus. Such accumulation of foreign matter, which may be carried into the regulator from the acetylene tank frequently interferes with the operation of the regulator valve, and in many instances, renders it leaky, whereby the operation of the apparatus is greatly impaired. It then becomes necessary to remove such foreign deposits from the regulator valve before the apparatus can again be operated with any degree of efficiency. In conventional regulators, it is usually necessary to remove the valve from the apparatus for cleaning. This involves time and labor and may result in serious delays. It is therefore desirable that some means be provided whereby the regulator valve may be kept free from foreign matter, whereby the apparatus may be operated for long periods without interruption, when desired.

An object of the present invention therefore is to provide a pressure regulator having means whereby the main regulator valve may readily be flushed periodically, without removing it from the regulator housing, whereby greater economy is obtained, and accidental interruptions in the operation of the apparatus are also eliminated.

A further object is to provide a regulator for controlling and regulating the flow of acetylene gas from the generator to the torch, comprising a flash back tank having a pressure regulator embodied directly in the construction thereof, whereby the flash back tank and the regulator may be constructed and assembled as a single unit which may readily be connected to the usual gas take-off pipe of the generator.

A further object is to provide a pressure regulator comprising a tank whose lower portion provides a flash back chamber having means for connecting it to a source of gas supply, and said tank having a gas chamber in its upper portion from which gas is supplied to the usual torch through a suitable conduit, and the flash back tank having means therein for filtering the gas delivered to the gas chamber, and a valve being interposed between the gas chamber and flash back tank for controlling the flow of gas into the gas chamber, said valve being automatically operated by the differential in the gas pressures in the gas chamber and the flash back chamber, thereby to automatically control the delivery of gas to the service line and maintain it at a constant pressure.

A further object is to provide a flash back tank having a gas intake in its lower portion, and provided with a float having a valve stem provided at its lower end with a valve adapted to close the gas intake, in the event that the water level in the tank drops to a predetermined level, whereby the operator is apprized of the fact that the flash back tank must be replenished with water, to maintain efficient operation of the apparatus.

Other objects of the invention reside in the arrangement of the float operated valve in the lower portion of the flash back tank, which has the dual function of interrupting the flow of gas to the gas chamber in the event that the water in the flash back tank drops to a predetermined low level, and also to shut off the supply of gas to the regulator, in the event an abnormal pressure should develop in the flash back tank; in the unique and simplified construction of the filter provided in the flash back tank; in the novel means for introducing water into the gas chamber of the regulator, whereby said water will flow downwardly through the control or regulator valve, thereby to flush it and its seat and free such parts of any accumulations of lime or other foreign matter tending to adhere thereto; and, in the general construction of the entire control apparatus, which is in the form of a single unit having means for readily attaching it to a conventional acetylene generator, said apparatus also being provided with means whereby excessive pressure developing therein may be manually released or, if not so released, said excessive pressure is automatically released from the chamber, when a predetermined maximum pressure is reached therein, thereby to prevent damage to the apparatus as a result of excessive pressure.

Other objects of the invention will appear from the following description and accompanying drawings and will be pointed out in the annexed claims. In the accompanying drawings there has been disclosed a structure designed to carry out the various objects of the invention but it is to be understood that the invention is not confined to the exact features shown as various changes may be made within the scope of the claims which follow.

In the drawings

Figure 1:
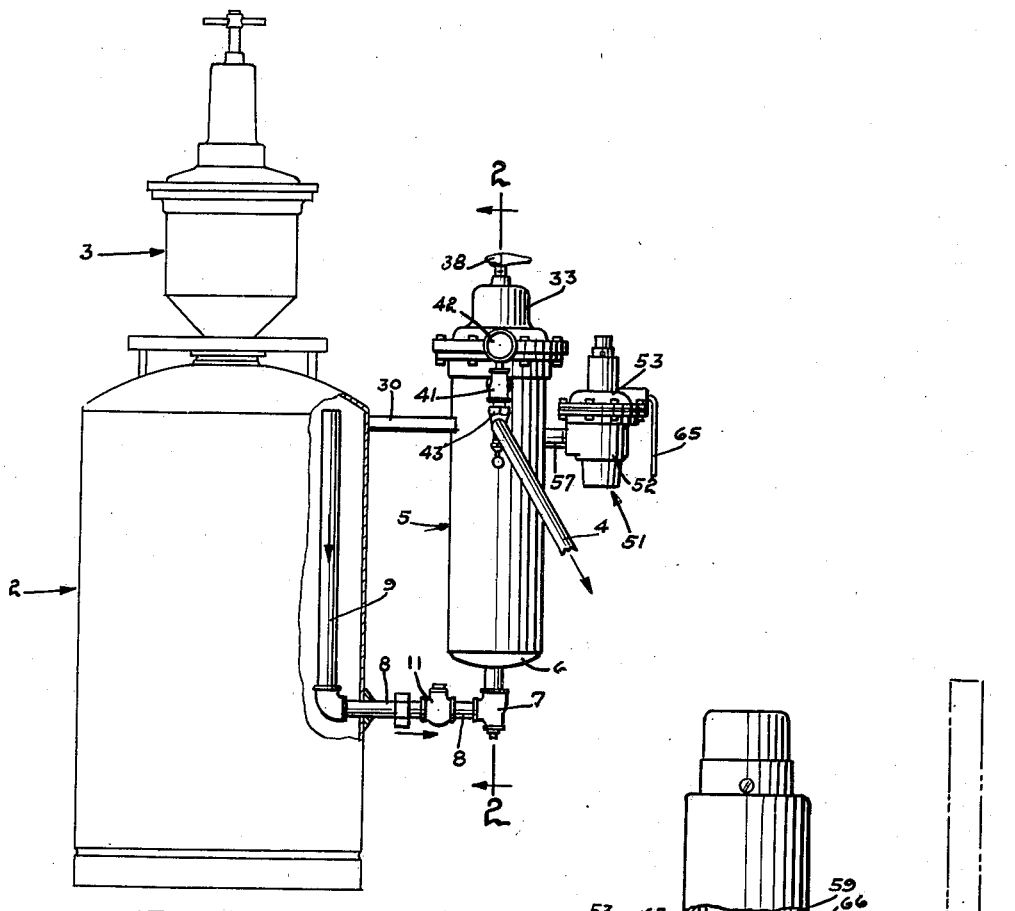
Figure 1 is a more or less diagrammatic view showing the invention applied to a conventional acetylene generator.
Figure 6:
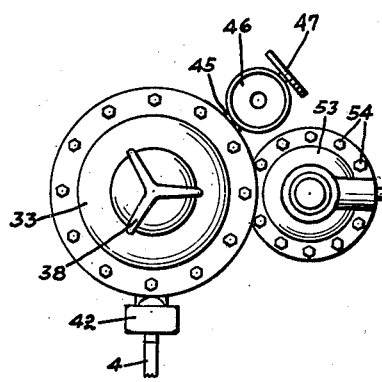
Figure 6 is a top view of Figure 2.

In the selected embodiment of the invention here shown, there is illustrated in Figure 1, for purposes of disclosure, a conventional acetylene generator, generally indicated by the numeral 2, and shown provided at its upper portion with the usual carbide feeding mechanism, generally indicated by the numeral 3. The generator 2 and feeding mechanism 3 form no part of the present invention and they are therefore only briefly illustrated and described.

Figures 2, 3, 4:
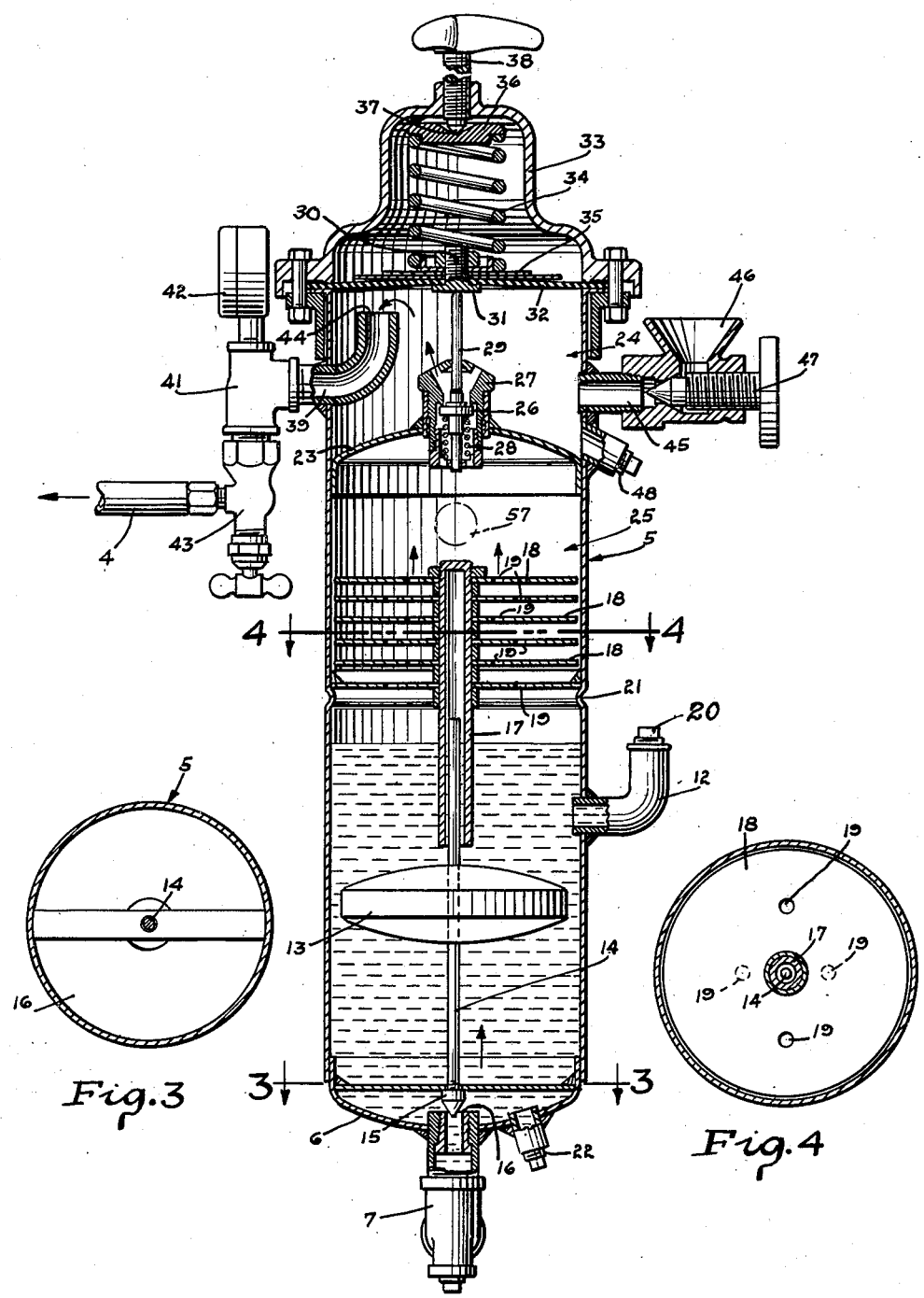
Figure 2 is an enlarged detail sectional view substantially on the line 2—2 of Figure 1, showing the general construction of the gas control means.
Figure 3 is a horizontal sectional view on the line 3—3 of Figure 2.
Figure 4 is a horizontal sectional view on the line 4—4 of Figure 2, showing the filter.

An important feature of the present invention resides in the means provided for regulating and controlling the flow of gas from the generator 2 to the service line or instrumentality to be supplied with gas. As best shown in Figure 2, the means provided for thus controlling and regulating the flow of gas from the generator 2 to the service line, indicated by the numeral 4 in Figures 1 and 2, comprises a tank 5 having a bottom wall 6 provided with a suitable fitting 7, to which one end of a pipe 8 is connected. The opposite end of the pipe 8 passes through the wall of the generator and has a pipe 9 connected thereto. The pipe 9 extends upwardly into the generator, as shown in Figure 1, whereby the gas is delivered thereto from the upper portion of the generator 2. A suitable check valve 11 may be interposed in the pipe 8 as a safety measure to prevent back pressure in the tank 5 to be transmitted to the interior of the acetylene tank 2.

The lower portion of the tank 5 is adapted to contain a supply of water, as best shown in Figure 2, which normally is maintained at a level substantially coincident with the upper end of an L-shaped fitting 12, mounted in the wall of the tank 5. The fitting 12 has a plug 20, which is removed from the fitting, when water is being introduced into the upper portion of the tank 5.

A float 13 is provided within the lower portion of the tank 5, and has a valve stem 14 whose lower end is shown provided with a suitable valve 15 adapted to engage a seat 16 provided in the intake fitting 7 of the pipe 8. The upper end of the valve stem 14 is guidingly supported within a tubular member 17 having a plurality of disks 18 secured thereto in spaced relation. Each disk 18 has two or more suitable perforations 19 therein, as best shown in Figure 4. The perforations of adjacent disks are staggered, as illustrated, whereby the gas flowing upwardly through the tank 4 will follow a tortuous path, as it passes through the apertures in the filter disks 18. The filter is secured in fixed relation within the tank 5 by an annular rib or bead 21, formed in the wall thereof, as clearly illustrated in Figure 2. A drain plug 22 is provided in the bottom wall 6 of the tank 4 to facilitate draining the water therefrom.

Another feature of the present invention resides in mounting the gas control and pressure regulating valve directly upon the tank 5, constituting the flash back chamber, whereby these parts may be assembled as a unit. As best shown in Figure 2, a partition 23 is provided in the upper portion of the tank 5, which divides it into two chambers 24 and 25. The upper chamber 24 will hereinafter be referred to as the gas chamber, and the lower chamber 25 as the filter chamber. A suitable spring-actuated valve 26 is mounted within a suitable valve housing 27 provided in the partition 23. The valve 26 is constantly urged towards its seat by a suitable spring 28 provided in the lower portion of the valve housing 27. The valve 26 has an upwardly extending stem 29 having its upper end arranged to engage a head 31 of a screw 30, secured to a diaphragm 32 having its marginal edge secured in leak-proof relation between the upper flanged end of the tank 5 and a bonnet 33 which form a part of the regulator. A suitable spring 34 is provided within the bonnet 33 and has its lower end seated upon a plate 35 secured to the upper surface of the diaphragm 32. The upper end of the spring 34 has a thrust plate 36 mounted thereon, the upper face of which has an axial socket adapted to receive the terminal 37 of a suitable adjusting screw 38. The adjusting screw 38 serves to vary the tension in the spring 34, whereby the flow of gas through the main control or regulator valve 26 may readily be controlled.

A gas outlet 39 is provided in the wall of the chamber 24 and is shown having a T-fitting 41 connected thereto, one end of which supports a suitable pressure gauge 42. A suitable shut-off valve 43 is secured to the lower end of the T-fitting 41 and has one end of the service line or conduit 4 connected thereto. The gas outlet pipe 39 extends upwardly within the chamber 24 and has its intake end 44 terminating in close proximity to the diaphragm 32.

Also secured in the wall of the chamber 24 is a water supply pipe 45 having a funnel-shaped intake 46 and a valve 47 for opening and closing the water intake or pipe 45. A drain plug 48 is provided in the wall of the chamber 24 adjacent to the partition 23, whereby excess water on the partition 23 within the gas chamber 24 may readily be drained therefrom.

Figure 5:
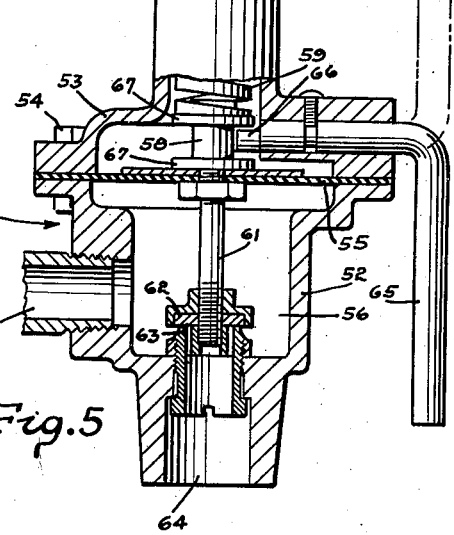
Figure 5 is a detail sectional view on an enlarged scale showing the interior construction of the pressure relief valve.

Means is also provided for either manually or automatically releasing excessive pressure from the filter chamber 25, should an excessive pressure accidentally develop therein. The means provided for thus releasing excessive pressure from the filter chamber 25 is best shown in Figure 5, and comprises a pressure release valve, generally indicated by the numeral 51. This valve comprises a suitable body 52 having a head 53 secured to the upper end thereof, by suitable bolts 54. A diaphragm 55 is interposed between the body 52 and head 53, and cooperates with the walls of the body 52 to provide a pressure chamber 56, which is in direct communication with the filter chamber 25 by a suitable pipe 57.

A flanged stud 58 is secured to the upper face of the diaphragm 55 and has one end of a suitable spring 59 supported thereon, the upper end of which is engaged with the upper end of the hood, whereby the spring constantly exerts a downward pressure on the diaphragm 55. A stem 61 projects downwardly from the diaphragm and has a suitable valve 62 secured to the lower end thereof, which normally is engaged with a seat 63, thereby to close the exhaust opening 64 of the pressure release valve 51. When the pressure in the chamber 56 reaches a predetermined figure, the diaphragm is distorted in an upward direction, whereby the valve 62 is automatically disengaged from its seat 63, whereby the excessive pressure within the filter chamber may escape to the atmosphere through the exhaust opening 64.

The means provided for manually unseating the valve 62 is shown comprising a crank arm or lever 65, rotatably mounted in the head 53 of the valve, as shown. A crank pin 66 is provided on the inner end of the crank arm 65 and is positioned between the spaced flanges 67 of the stud 58. When the arm 65 is in the full line position shown in Figures 1 and 5, the crank pin 66 will permit the spring 59 to seat the valve 62. The spacing between the flanges 67 with respect to the diameter of the crank pin 66 and the movement thereof is such, however, that when an excessive pressure develops within the chamber 56, the diaphragm may move upwardly sufficiently to open the valve 62. When the operating handle 65 is rotated to the dotted line position shown in Figure 5, the crank pin 66 will engage the upper flange 67 of the stud 58 and thereby move the diaphragm upwardly against the tension of the spring to unseat the valve 62.

Operation

In the operation of this novel pressure control apparatus, the flash back tank is filled with water substantially to the level indicated in Figure 2. This level is determined by the top of the fitting or elbow 12 from which the water will flow when the level reaches the top of said fitting provided, of course, that the plug 20 is removed therefrom. The shut-off valve 43 is then opened to permit the gas to flow from the chamber 24 through the conduit 4 to the torch or other device to be supplied with gas. The hand wheel 38 at the top of the apparatus is rotated to adjust the tension of the spring 34, so that the control valve 26 is opened only when the pressure in the gas chamber 24 drops below a predetermined figure.

The apparatus shown is particularly well adapted for use in connection with acetylene generators. The generator is operated in the usual manner to generate gas which flows through the pipe 8 and enters the bottom of the flash back tank and passes upwardly through the water therein in the form of bubbles. When the gas reaches the filter chamber above the water level, it passes through the apertures in the filter disks 18, and upwardly through the regulating valve 26 into the gas chamber 24. From the gas chamber, the gas passes through the L-shaped fitting 44, control valve 43, and conduit 4 to the torch.

The float 13 in the flash back tank serves to automatically interrupt the flow of gas into the flash back tank from the pipe 8, in the event that an abnormal pressure develops within the flash back tank. Also, when the water in the flash back tank drops below the flotation level of the float 13, the valve 15 will engage its seat and interrupt the supply of gas to the flash back tank from the generator, whereby the operator is apprized of the fact that water in the flash back tank requires replenishing.

When additional water is introduced into the flash back tank, it is poured into the hopper 46 of the water intake valve 47, whereby it is received in the gas chamber 24, from whence it flows through the open regulating valve 26 into the flash back tank, thereby thoroughly flushing and cleansing the valve 26 and its seat 27. It is to be understood that when water is introduced into the apparatus, the adjusting wheel 38 at the top of the apparatus is rotated in a direction to increase the tension spring 34, whereby said spring will force the diaphragm downwardly and open the control valve 26, which valve is retained in open position during the introduction of water into the flash back tank. When the level of the water in the tank reaches the top of the L-shaped fitting 12, the plug 20 is restored in the fitting 12 and the operating wheel 38 rotated in a direction to restore the tension in the spring 34 to its normal condition, whereupon the control valve 26 is closed by the spring 34. The apparatus is then ready for use.

The valve 51, shown in Figure 5, provides means for automatically releasing the pressure in the flash back tank, in the event that it reaches an abnormal figure. The valve 51 may also be manually operated by manipulation of the operating handle 65, as hereinbefore stated. It will thus be seen that the relief valve 51 provides means for releasing excessive pressure from the flash back tank and generator 2, either manually or automatically, in the event of excessive pressures therein.

The construction of the apparatus herein disclosed is comparatively simple and inexpensive, and it provides a very unique structure, in that the pressure regulating means, including the valve 26, diaphragm 32 and spring 34, are mounted directly upon the flash back tank, which provides the main support therefor. Thus, the pressure regulating means, filter, and flash back tank, may be assembled as a single unit independently of the acetylene generator 2, and, because of its compactness, readily lends itself for connection thereto by the pipe 8. A suitable supporting member 30, shown interposed between the generator 2 and the tank 5, may be provided if necessary, as best shown in Figure 1.

I claim:

1. An apparatus for filtering and regulating the flow of gas from a generator to a device to be supplied such as a torch, said apparatus comprising a casing having a water chamber in its lower portion serving as a filter and flash back chamber, means for supplying gas to said chamber whereby the gas must pass through the water therein, a partition in the upper portion of the casing above the water level, a pressure regulating valve in said partition having means for connecting it to the torch, whereby gas is supplied thereto at constant pressure, and a normally closed water intake in the wall of the casing above said partition, whereby when fresh water is introduced into the casing through said intake and the regulating valve is open, said water will flow through and flush the open regulating valve and its seat of foreign matter.

2. A gas regulating and filtering apparatus comprising a casing having a gas intake in its lower portion adapted to be connected to a source of gas supply, a housing secured to the upper end of the casing, a partition in the casing below said housing dividing the casing into a low pressure gas chamber located above the partition, and a flash back chamber disposed below the partition, water in the flash back chamber, a regulating valve in said partition, a fresh water intake in the casing above the partition, whereby when water is introduced into the casing, and said regulating valve is open, said water will flow through the regulating valve and into the flash back chamber, thereby flushing said valve, means for conducting gas from the low pressure chamber to a device to be supplied, and pressure responsive means for controlling the operation of the regulating valve.

3. An apparatus adapted for use in connection with an acetylene generator to filter and regulate the flow of gas therefrom, said apparatus comprising a casing having a gas intake at its lower portion adapted to be connected to the gas outlet of a generator, water in the lower portion of said chamber through which the gas must pass, a pressure regulating valve in the upper portion of the casing adapted to control the flow of gas from the casing to a torch or other device to be serviced, a water intake in the wall of the casing above the regulating valve, whereby when fresh water is introduced into the casing, and the regulating valve is open, said water will flow through the regulating valve and flush it of foreign matter, and a float operated valve for automatically shutting off the supply of gas to the casing from the generator, in the event that the water supply therein becomes low.

4. An apparatus adapted for use in connection with an acetylene generator to filter and regulate the flow of gas therefrom, said apparatus being in the form of a unitary structure comprising an upright cylindrical casing having a gas intake in its lower portion adapted to be connected to the gas outlet of a generator, a valve for said intake, a partition adjacent the upper end of the casing, a housing secured to the upper end of the casing and cooperating with said partition to provide a low pressure gas chamber, and whereby the lower portion of the casing below said partition may serve as a filter and flash back chamber, a pressure responsive valve in said partition made operable by variations in gas pressure in said chambers, a water intake in the wall of the casing above said partition whereby when water is introduced into the casing, and the regulating valve is open, said water will flow through the regulating valve and flush it of foreign matter, said intake valve having an upright stem guidingly supported within the casing, and a float secured to said stem and normally submerged in the water in the flash back chamber, said float normally holding the intake valve in open position and being adapted to close said valve when the water level in the casing drops to a predetermined level, thereby to indicate to the operator that the water in the casing requires replenishing.

5. An apparatus adapted for use in connection with an acetylene generator to filter and regulate the flow of gas therefrom, said apparatus being in the form of a unitary structure comprising an upright cylindrical casing having a gas intake in its lower portion adapted to be connected to the gas outlet of a generator, a partition adjacent the upper end of the casing, a housing secured to the upper end of the casing and cooperating with said partition to provide a low pressure gas chamber, and whereby the lower portion of the casing below said partition may serve as a filter and flash back chamber, a pressure responsive valve in said partition for controlling the flow of filtered gas from the flash back chamber into the low pressure chamber, a filter unit in the flash back chamber having a vertical guide therein, a valve for the gas intake in the lower portion of the flash back chamber, said valve having a stem guidingly supported in said guide, and a float secured to the valve stem and normally submerged in the water in the flash back chamber, said float normally holding the intake valve in open position and being adapted to close said valve when the water level in the casing drops to a predetermined level, thereby to indicate to the operator that the water in the casing requires replenishing.

ELMER H. SMITH.